3,414,581
PRODUCTION OF INDAZOLE-(3)-
CARBOXYLIC ACIDS
Matthias Seefelder, Ludwigshafen (Rhine), and Herbert Armbrust, Frankenthal, Palatinate, Germany, assignors to Badische Anilin- & Soda-Fabrik Aktiengesellschaft, Ludwigshafen (Rhine), Germany
No Drawing. Filed Feb. 19, 1965, Ser. No. 434,099
Claims priority, application Germany, Feb. 25, 1964, B 75,573
9 Claims. (Cl. 260—310)

ABSTRACT OF THE DISCLOSURE

Process of providing indazole-(3)-carboxylic acids by reacting a 2-diazophenylglyoxylic acid with dithionous acid or dithionite at −20° to +100° C. and a pH of 0 to 12. The products are especially useful as intermediates for dyes.

---

This invention relates to the production of derivatives of indazole which are valuable for use as intermediates. More particularly, the invention relates to the production of indazole-(3)-carboxylic acids and their derivatives bearing substituents in the phenyl radical.

We have found that indazole-(3)-carboxylic acids are obtained when 2-diazophenylglyoxylic acids are reacted with dithionous acid or dithionite.

When unsubstituted 2-diazophenylglyoxylic acid is used, the reaction proceeds according to the equation:

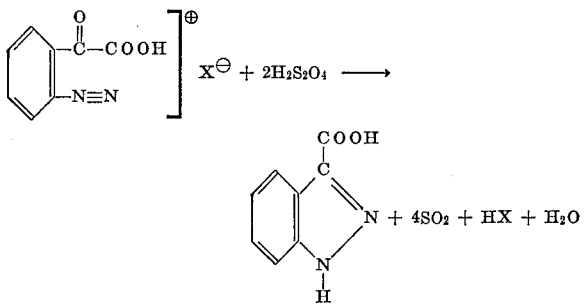

$X^{\ominus}$ denoting the radical of an acid, for example a mineral acid, sulfonic acid or carboxylic acid.

The phenyl ring of the 2-diazophenylglyoxylic acid may bear 1 to 4 inert substituents such as alkyl radicals, especially alkyl radicals with 1 to 4 carbon atoms, other hydrocarbon radicals, and also halogen atoms; other substituents which are inert under the reaction conditions may also be present. Examples are:

4-chloro-5-bromo-2-diazophenylglyoxyl acid,
6-chloro-2-diazophenylglyoxylic acid,
3,5-dibromo-2-diazophenylglyoxylic acid,
5-methyl-2-diazophenylglyoxylic acid and
5-ethyl-2-diazophenylglyoxylic acid may serve as initial materials.

The molar ratio of the said reducing agent (dithionous acid or dithionite) to the 2-diazophenylglyoxylic acids may vary within wide limits. The use of an excess of the reducing agent of up to about three times the stiochiometric amount, particularly advantageously up to twice the stoichiometric amount, has proved to be suitable. A wide temperature range may be used for the reaction; it is advantageous to use temperatures of from −20° C. to about 100° C., preferably from 0° to 50° C. Although the reaction is not dependent on pH-value, it is preferably carried out at a pH of from 0 to 12, in particular from 5 to 10.

The dithionous acid or dithionite may be first dissolved in water and the desired diazo compound added in portions, either as such or in solution. It is also possible to place the diazo compound in a reactor, if desired without isolating it from the solution in which it has been prepared (for example by reaction of isatins with nitrosating agents), and allowing the dissolved reducing agent to flow in. The reaction mixture is worked up in a conventional way, for example by acidification, suction filtration and drying. A particularly advantageous method is heating the neutral or alkaline reaction mixture to 80° to 90° C. or more and then working it up in the way described above.

Having regard to earlier conceptions as to the stability of the initial compounds for the new process (see for example Baeyer and Fritsch, Ber., 17 (1884), 973; Schad, Ber., 26 (1893), 216; and Auwers and Dereser, Ber., 52 (1919) 1344), it is extremely surprising that there is no need whatever to work under special precautions, particularly careful cooling (see particularly Auwers, l.c., paragraph 4), but that on the contrary cooling is completely unnecessary. Not only are considerable advantages achieved as regards the yields and the purity of the products, but also a prejudice has been overcome (see for example Schad, l.c., penultimate paragraph) in that it is no longer necessary to use tin(II) chloride as reducing agent for the diazophenylglyoxylic acid (which leads to serious contamination of the reaction product), excellent yields of very pure indazole-(3)-carboxylic acids being obtained using dithionous acid.

The compounds obtained may be used for the production of dyes, pesticides and pharmaceuticals.

The invention is further illustrated by the following examples. The parts specified in the examples are parts by weight.

EXAMPLE 1

27.4 parts of the bisulfate of 2-diazophenylglyoxylic acid is introduced during the course of twenty minutes at 20° C. into a solution of 34.8 parts of sodium dithionite in 100 parts of water. The mixture is stirred for another ten minutes, made weakly alkaline with caustic soda solution and heated to 80° to 90° C. The indazole-(3)-carboxylic acid formed is precipitated by acidification with mineral acid. The mixture is worked up by cooling, suction filtration and drying. 13.0 parts (80% of the theory) of the acid is obtained. It has a melting point of 261° to 263° C. with decomposition.

EXAMPLE 2

14.4 parts of the bisulfate of 2-diazo-5-methylphenylglyoxylic acid is introduced at 5° to 10° C. into a solution of 17.4 parts of sodium dithionite in 250 parts of water and the reaction solution worked up as described in Example 1. The 5-methylindazole-(3)-carboxylic acid obtained (6.7 parts, 76.2% of the theory) melts at 280° C. with decomposition.

EXAMPLE 3

An aqueous solution of 2-diazo-4-chlorophenylglyoxylic acid (obtained from 9.1 parts of 4-chloroisatin) is allowed to flow into a solution of 17.4 parts of sodium dithionite in 100 parts of water at 0° to 5° C. and the reaction mixture is worked up as described in Example 1. 4.9 parts (50% of the theory, with reference to 4-chloroisatin used) of 4-chloroindazole-(3)-carboxylic acid is obtained having a melting point of 246° C. (with decomposition).

EXAMPLE 4

12.7 parts of the bisulfate of 2-diazo-5-bromo-6-chlorophenylglyoxylic acid is introduced at 5° to 10° C. into an aqueous solution of 10.6 parts of sodium dithionite in 100 parts of water. The reaction mixture is worked up as described in Example 1. 6.5 parts of 4-chloro-5-bromoindazole-(3)-carboxylic acid (79% of the theory) is obtained having a melting point of 246° C. (with decomposition).

We claim:
1. A process for the production of an indazole-(3)-carboxylic acid which comprises treating a compound selected from the group consisting of 2-diazophenylglyoxylic acid and 2-diazophenylglyoxylic acid in which the phenyl ring bears 1 to 2 substitutents which are inert under the reaction conditions with sodium dithionite dissolved in water as a reducing agent at a temperature of from −20 to +100° C. and at a pH of from 0 to 12.
2. A process as claimed in claim 1 wherein the 2-diazophenylglyoxylic acid used bears on the phenyl ring 1 to 2 substituents selected from the group consisting of alkyl of 1 to 4 carbon atoms and halogen.
3. A process as claimed in claim 1 wherein the 2-diazophenylglyoxylic acid used is 4-chloro-5-bromo-2-diazophenylglyoxylic acid.
4. A process as claimed in claim 1 wherein the 2-diazophenylglyoxylic acid used is 6-chloro-2-diazophenylglyoxylic acid.
5. A process as claimed in claim 1 wherein the 2-diazophenylglyoxylic acid used is 3,5-dibromo-2-diazophenylglyoxylic acid.
6. A process as claimed in claim 1 wherein the 2-diazophenylglyoxylic acid used is 5-methyl-2-diazophenylglyoxylic acid.
7. A process as claimed in claim 1 wherein the 2-diazophenylglyoxylic acid used is 5-ethyl-2-diazophenylglyoxylic acid.
8. A process as claimed in claim 1 carried out at a temperature of from 0° to 50° C.
9. A process as claimed in claim 1 wherein the reducing agent is used in excess up to 3 times the stoichiometric amount.

References Cited

UNITED STATES PATENTS

| | | | |
|---|---|---|---|
| 2,600,000 | 6/1952 | Kamlet | 260—569 |
| 2,734,798 | 2/1956 | Kamlet | 260—569 |
| 3,152,112 | 10/1964 | Laird et al. | 260—569 |

OTHER REFERENCES

Auwers et al., Berichte, vol. 52, pages 1340–51 (1919).
Schad, Berichte, vol. 26, pages 216–24 (1893).

HENRY R. JILES, *Primary Examiner.*

NATALIE TROUSOF, *Assistant Examiner.*

UNITED STATES PATENT OFFICE
CERTIFICATE OF CORRECTION

Patent No. 3,414,581                                              December 3, 1968

Matthias Seefelder et al.

It is certified that error appears in the above identified patent and that said Letters Patent are hereby corrected as shown below:

Column 1, line 54, "diazophenylglyoxyl" should read -- diazophenylglyoxylic --; line 64, "stiochiometric" should read -- stoichiometric --.

Signed and sealed this 21st day of April 1970.

(SEAL)
Attest:

Edward M. Fletcher, Jr.
Attesting Officer

WILLIAM E. SCHUYLER, JR.
Commissioner of Patents